(12) United States Patent
Ng et al.

(10) Patent No.: US 12,348,456 B2
(45) Date of Patent: Jul. 1, 2025

(54) OVER-THE-AIR COORDINATION OF RADAR AND WIRELESS COMMUNICATION SYSTEMS ON A TERMINAL

(71) Applicant: Samsung Electronics Co., Ltd., Suwon-si (KR)

(72) Inventors: Boon Loong Ng, Plano, TX (US); Vutha Va, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 17/663,639

(22) Filed: May 16, 2022

(65) Prior Publication Data

US 2022/0407661 A1    Dec. 22, 2022

Related U.S. Application Data

(60) Provisional application No. 63/212,261, filed on Jun. 18, 2021.

(51) Int. Cl.
*H04L 5/00* (2006.01)
*G01S 7/02* (2006.01)
(Continued)

(52) U.S. Cl.
CPC ............ *H04L 5/0062* (2013.01); *G01S 7/023* (2013.01); *H04L 5/0048* (2013.01);
(Continued)

(58) Field of Classification Search
CPC ..... H04L 5/0062; H04L 5/0048; G01S 7/023; G01S 7/003
See application file for complete search history.

(56) References Cited

U.S. PATENT DOCUMENTS 10,939,431 B2    3/2021    Bhattad et al.
2017/0257850 A1    9/2017    Oh et al.
(Continued)

FOREIGN PATENT DOCUMENTS

KR    20180112804 A    10/2018

OTHER PUBLICATIONS

Oppo, "On configured grant for NR-U", 3GPP TSG-RAN WG1 Meeting #96, R1-1901925, Feb. 2019, 4 pages (Year: 2019).*

(Continued)

*Primary Examiner* — Chae S Lee

(57) ABSTRACT

A method includes obtaining configuration information for a radio interface between an electronic device and a base station. The method includes determining uplink transmission information based on the obtained configuration information. The uplink transmission information includes: an indication of one or more types of uplink channels in a plurality of communication time slots (CTSs) of the radio interface; a transmission start time for each of the one or more types of uplink channels; and a transmission duration for each of the one or more types of uplink channels. The method includes, for one or more of the plurality of CTSs: determining, based on the transmission start time, whether the one or more CTSs on the radio interface is occupied; and in response to a determination that the one or more CTSs on the radio interface is not occupied, performing radar operations during a remainder of the transmission duration.

20 Claims, 8 Drawing Sheets

(51) Int. Cl.
*H04W 72/0446* (2023.01)
*H04W 72/12* (2023.01)
*H04W 72/20* (2023.01)
*H04W 88/06* (2009.01)

(52) U.S. Cl.
CPC ... *H04W 72/0446* (2013.01); *H04W 72/1215* (2013.01); *H04W 72/20* (2023.01); *H04W 88/06* (2013.01)

(56) References Cited

U.S. PATENT DOCUMENTS

| | | |
|---|---|---|
| 2018/0014146 A1 | 1/2018 | Gulati et al. |
| 2020/0314876 A1 | 10/2020 | Bhattad et al. |
| 2020/0351914 A1 | 11/2020 | Dahlman et al. |
| 2021/0007119 A1 | 1/2021 | Li et al. |
| 2021/0022134 A1 | 1/2021 | Chen et al. |
| 2022/0128648 A1* | 4/2022 | Li ............ G01S 7/352 |
| 2022/0365167 A1* | 11/2022 | Zhang ............ G01S 13/765 |
| 2023/0188275 A1* | 6/2023 | Ren ............ G01S 7/415 370/329 |
| 2024/0241215 A1* | 7/2024 | Duan ............ G01S 7/006 |
| 2024/0241217 A1* | 7/2024 | Herbertsson ............ G01S 7/35 |

OTHER PUBLICATIONS

International Search Report and Written Opinion issued Aug. 16, 2022 regarding International Application No. PCT/KR2022/007174, 7 pages.

Petrov et al., "On Unified Vehicular Communications and Radar Sensing in Millimeter-Wave and Low Terahertz Bands", arXiv:1901.06980v1 [cs.NI], Jan. 2019, 8 pages.

Oppo, "On configured grant for NR-U", 3GPP TSG-RAN WG1 Meeting #96, R1-1901925, Feb. 2019, 4 pages.

Kumari et al., "Adaptive and Fast Combined Waveform-Beamforming Design for mmWave Automotive Joint Communication-Radar", arXiv:2009.02633v1 [eess.SP], Sep. 2020, 13 pages.

* cited by examiner

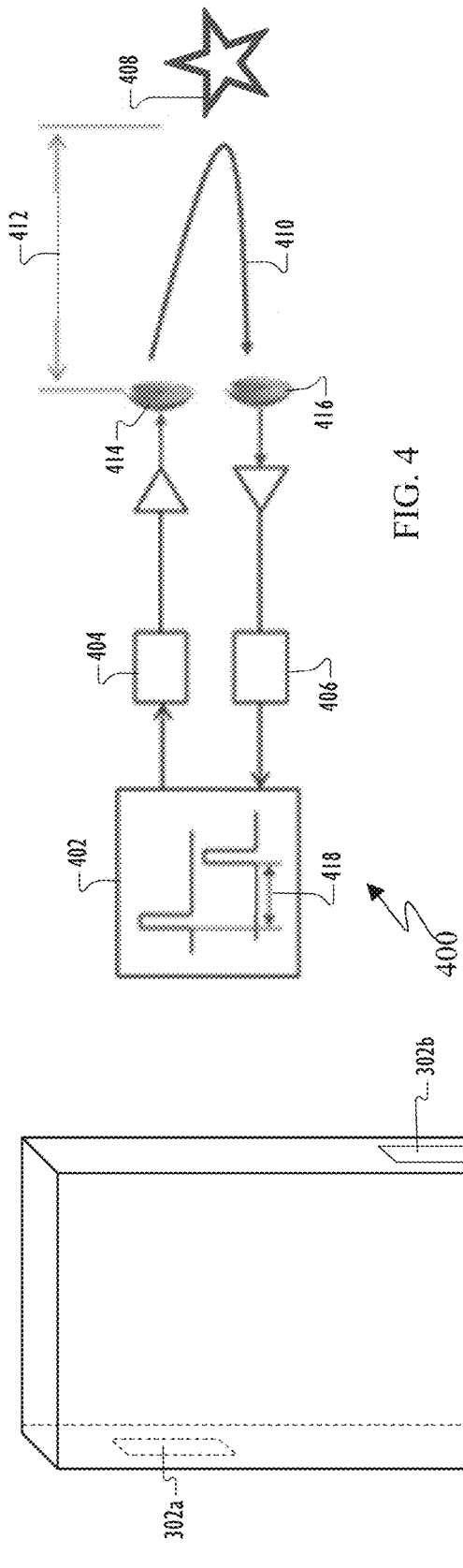
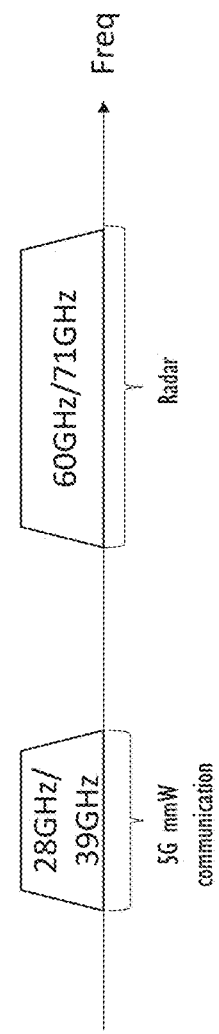
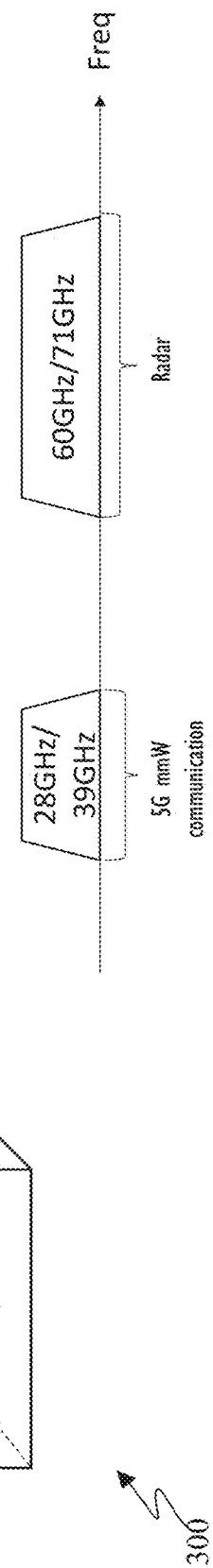
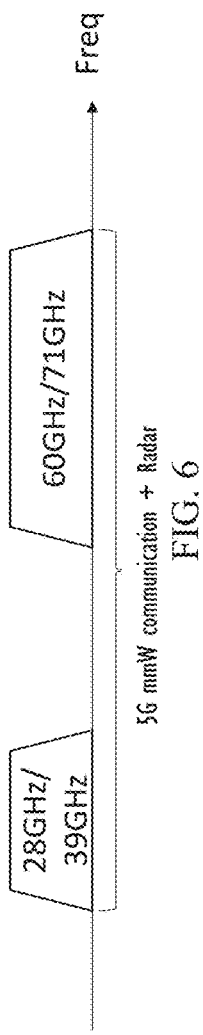
FIG. 3
FIG. 4
FIG. 5
FIG. 6

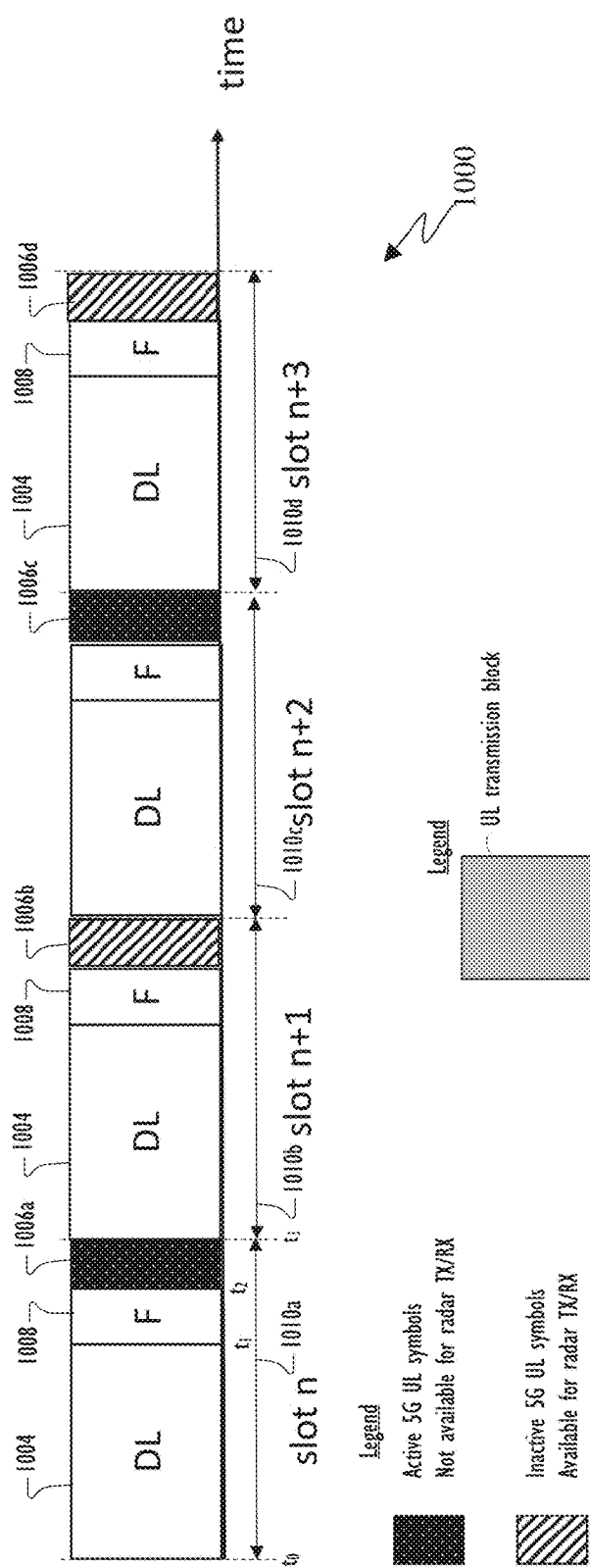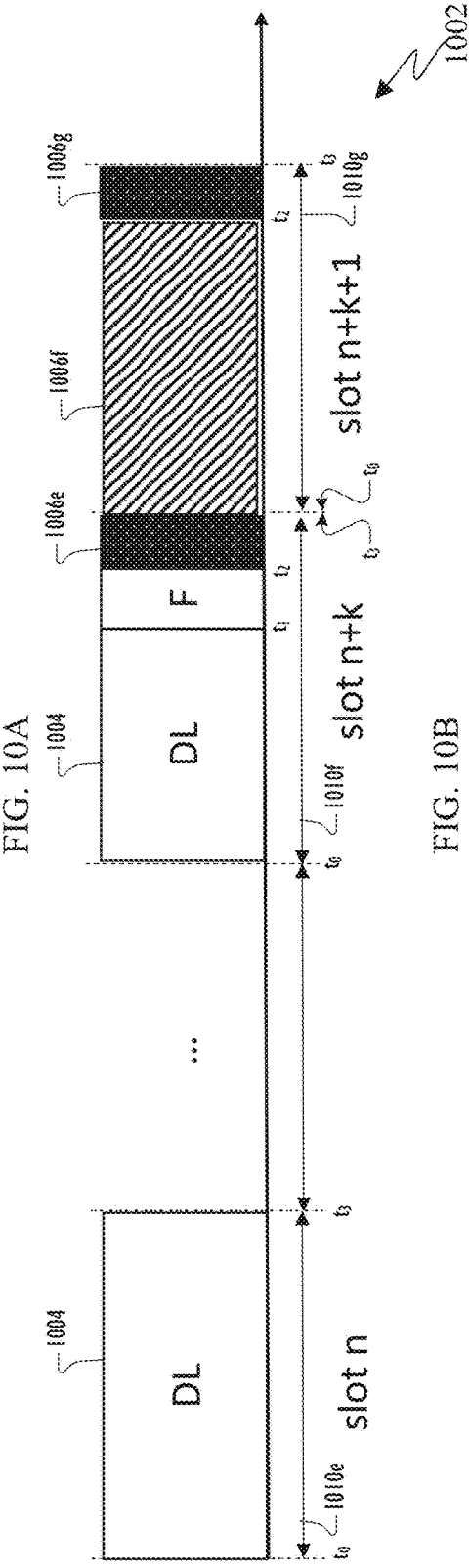
FIG. 10A
FIG. 10B

OVER-THE-AIR COORDINATION OF RADAR AND WIRELESS COMMUNICATION SYSTEMS ON A TERMINAL

CROSS-REFERENCE TO RELATED APPLICATION(S) AND CLAIM OF PRIORITY

This application claims priority under 35 U.S.C. § 119(e) to U.S. Provisional Patent Application No. 63/212,261 filed on Jun. 18, 2021. The above-identified provisional patent application is hereby incorporated by reference in its entirety.

TECHNICAL FIELD

This disclosure relates generally to wireless communication systems. More specifically, this disclosure relates to methods for over-the-air coordination of radar and wireless communication systems on a terminal.

BACKGROUND

A communication system includes a DownLink (DL) that conveys signals from transmission points such as Base Stations (BSs) or gNodeBs to User Equipments (UEs) and an UpLink (UL) that conveys signals from UEs to reception points such as gNodeBs. A UE, also commonly referred to as a terminal or a mobile station, may be stationary or mobile and may be a cellular phone, a personal computer device, etc. A gNodeB, which is generally a fixed station, may also be referred to as an access point or other equivalent terminology.

For millimeter wave (mmWave), the number of antenna elements can be large for a given form factor. However, the number of digital chains is limited due to hardware constraints (such as the feasibility to install a large number of ADCs/DACs at mmWave frequencies). In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval.

SUMMARY

This disclosure provides methods for over-the-air coordination of radar and wireless communication systems on a terminal.

In one embodiment, a method for over-the-air coordination of radar and wireless communication systems on a terminal is provided. The method includes obtaining configuration information for a radio interface between an electronic device and a base station. The method includes determining uplink transmission information based on the obtained configuration information. The uplink transmission information includes an indication of one or more types of uplink channels in a plurality of communication time slots of the radio interface. The uplink transmission information includes a transmission start time for each of the one or more types of uplink channels. The uplink transmission information includes a transmission duration for each of the one or more types of uplink channels. The method includes, for one or more of the plurality of communication time slots: determining, based on the transmission start time, whether the one or more communication time slots on the radio interface is occupied; and in response to a determination that the one or more communication time slots on the radio interface is not occupied, performing radar operations during a remainder of the transmission duration.

In another embodiment, an electronic device for over-the-air coordination of radar and wireless communication systems on a terminal is provided. The electronic device includes a radar circuit configured for the electronic device to operate using radar operations. The electronic device includes a wireless communication circuit configured for the electronic device to operate using a wireless communication protocol different from the radar operations. The electronic device includes a processor configured to obtain configuration information for a radio interface between the electronic device and a base station. The processor is configured to determine uplink transmission information based on the obtained configuration information. The uplink transmission information includes an indication of one or more types of uplink channels in a plurality of communication time slots of the radio interface. The uplink transmission information includes a transmission start time for each of the one or more types of uplink channels. The uplink transmission information includes a transmission duration for each of the one or more types of uplink channels. The processor is configured to for one or more of the plurality of communication time slots: determine, based on the transmission start time, whether the one or more communication time slots on the radio interface is occupied; and in response to a determination that the one or more communication time slots on the radio interface is not occupied, perform radar operations during a remainder of the transmission duration.

In yet another embodiment a non-transitory computer readable medium embodying a computer program for over-the-air coordination of radar and wireless communication systems on a terminal is provided. The computer program includes computer readable program code that when executed causes at least one processor to obtain configuration information for a radio interface between the electronic device and a base station. The computer readable program code causes the processor to determine uplink transmission information based on the obtained configuration information. The uplink transmission information includes an indication of one or more types of uplink channels in a plurality of communication time slots of the radio interface. The uplink transmission information includes a transmission start time for each of the one or more types of uplink channels. The uplink transmission information includes a transmission duration for each of the one or more types of uplink channels. The computer readable program code causes the processor to for one or more of the plurality of communication time slots: determine, based on the transmission start time, whether the one or more communication time slots on the radio interface is occupied; and in response to a determination that the one or more communication time slots on the radio interface is not occupied, perform radar operations during a remainder of the transmission duration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases, None of the description in this application should be read as implying that any particular element, step, or function is an essential element that must be included in the claim scope. The scope of patented subject matter is defined only by the claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a three-dimensional view of an example electronic device that includes multiple millimeter wave (mmWave) antenna modules in accordance with an embodiment of this disclosure;

FIG. 4 illustrates an example architecture of a monostatic radar in an electronic device 400 in accordance with an embodiment of this disclosure;

FIG. 5 illustrates frequency spectra for operating 5G communication at different frequency bands than radar operates in accordance with an embodiment of this disclosure;

FIG. 6 illustrates frequency spectra for 5G communication operations and radar operations sharing the same frequency bands in accordance with an embodiment of this disclosure;

FIG. 10A illustrates a first example of a channel sensing outcome and resulting radar operation in accordance with an embodiment of this disclosure;

FIG. 10B illustrates a second example of a channel sensing outcome and resulting radar operation in accordance with an embodiment of this disclosure;

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Figure 1:
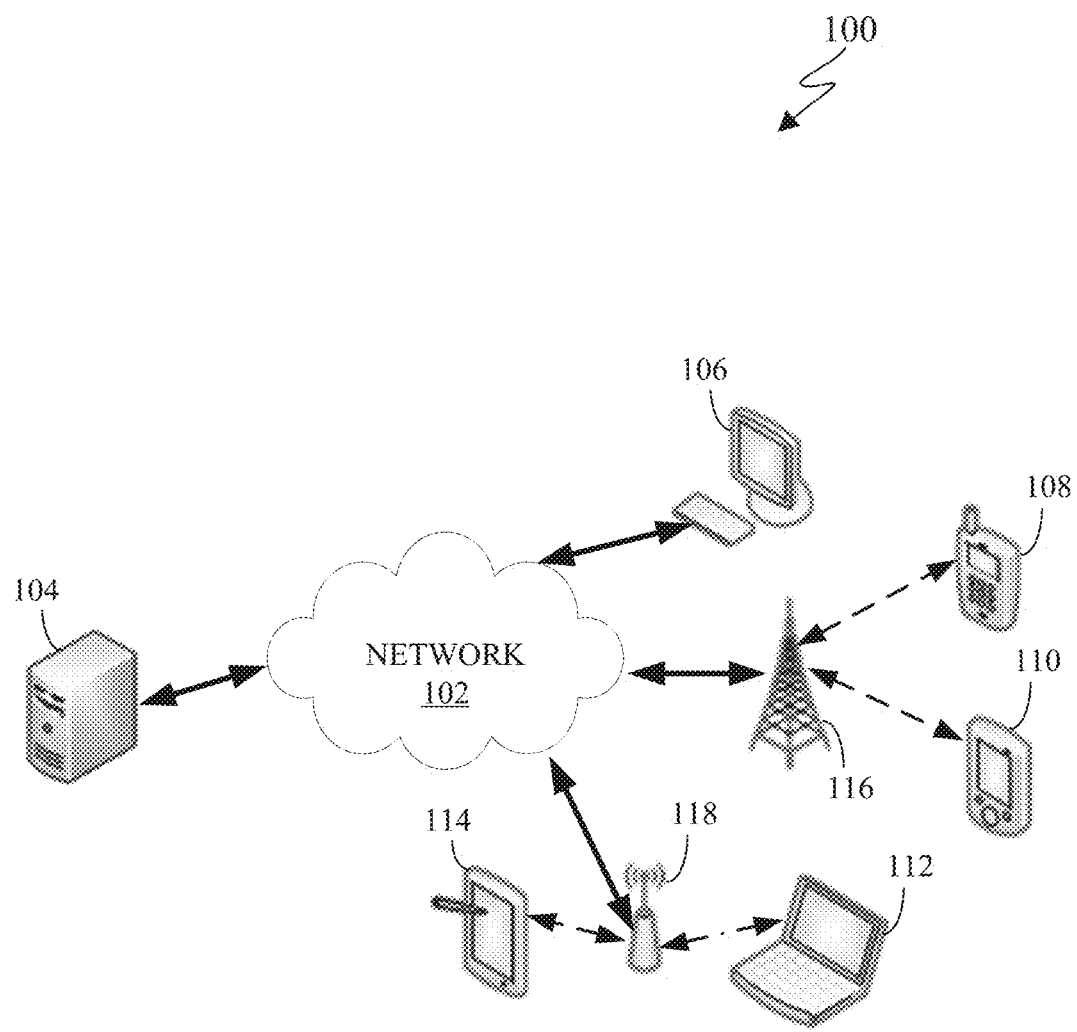
FIG. 1 illustrates an example communication system in accordance with an embodiment of this disclosure.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
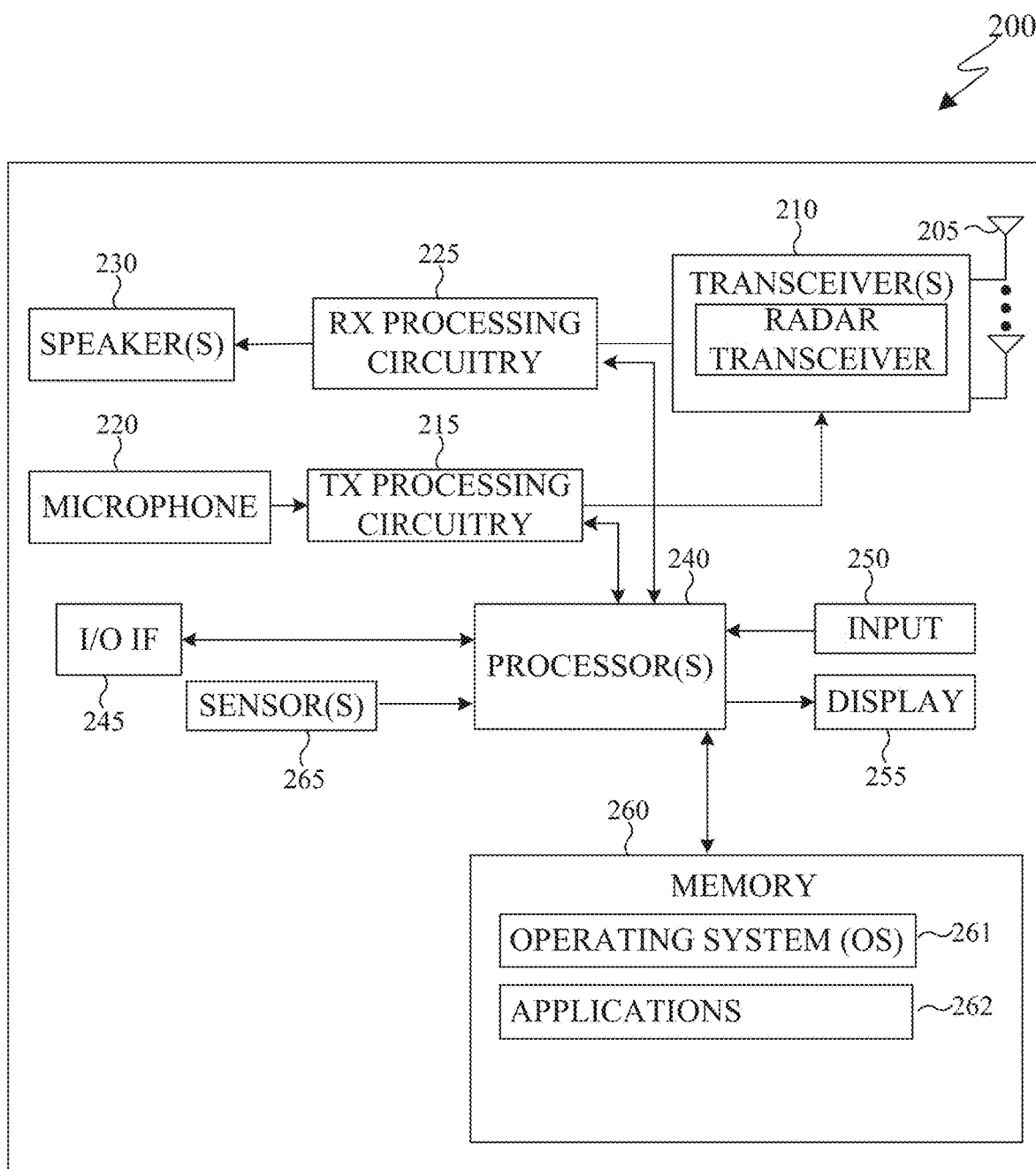
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies, for example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

In certain embodiments, the radar transceiver 270 is a monostatic radar. In A monostatic radar includes a transmitter of a radar signal and a receiver, which receives a delayed echo of the radar signal, which are positioned at the same or similar location. For example, the transmitter and the receiver can use the same antenna or nearly co-co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter of can transmit millimeter wave (mm-Wave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving.

FIG. 5 illustrates frequency spectra for operating 5G communication at different frequency bands than radar operates in accordance with an embodiment of this disclosure. The example shown in FIG. 5 is one possible frequency operation framework of mmWave communication and radar operation, namely with non-overlapping frequency.

FIG. 6 illustrates frequency spectra for 5G communication operations and radar operations sharing the same frequency bands in accordance with an embodiment of this disclosure. The example shown in FIG. 6 is one possible frequency operation framework of mmWave communication and radar operation, namely with overlapping frequency. The overlapping frequency can be for a particular band such as the 60 GHz/71 GHz band.

Although FIG. 5 and FIG. 6 illustrate two examples of frequency spectra for 5G communication operations and radar operations, various changes may be made to FIG. 5 and FIG. 6. As a particular example, in another possible frequency operation framework, radar operating at the 24 GHz band can interfere with 5G communication at 28 GHz band.

Figures 7, 8:
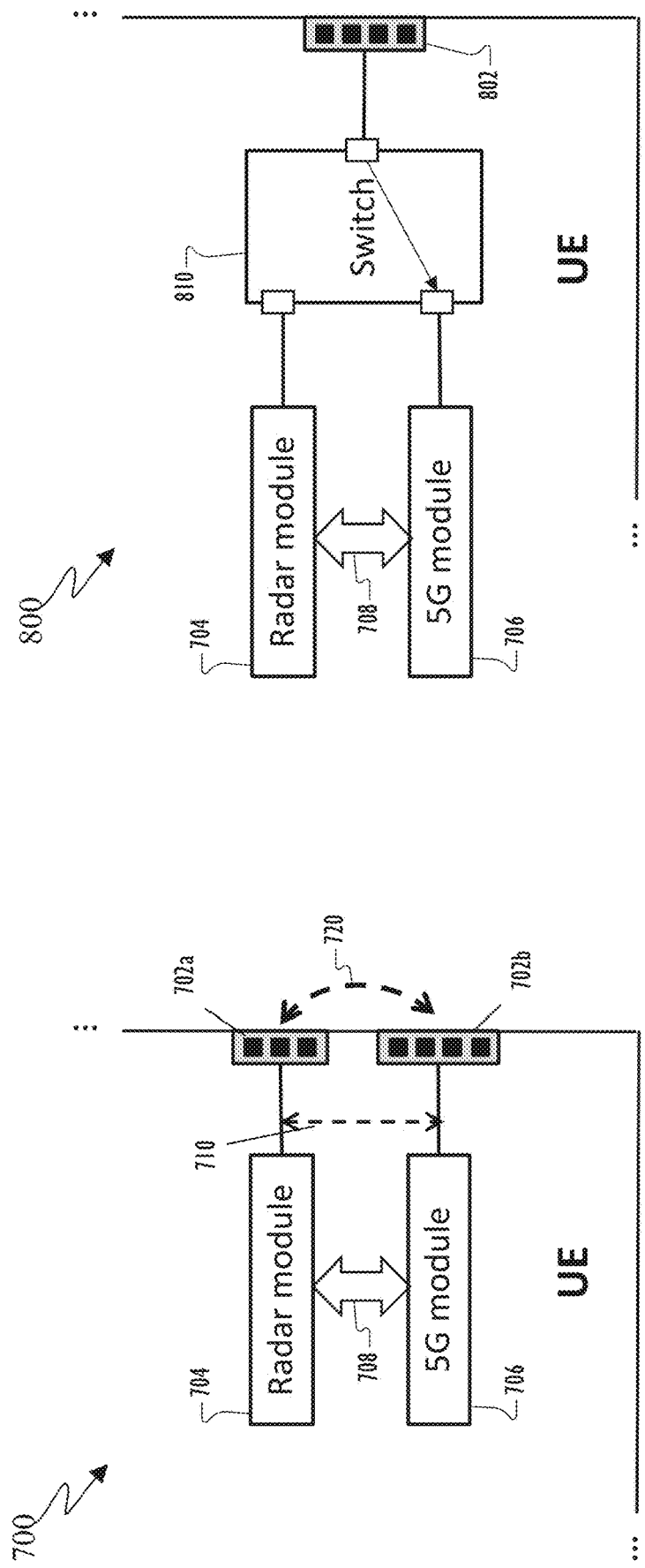
FIG. 7 illustrates an example electronic device that includes an antenna panel for radar operations and a separate antenna panel for 5G communication operations in accordance with an embodiment of this disclosure.
FIG. 8 illustrates an example electronic device that includes a common antenna panel for radar operations and 5G communication operations in accordance with an embodiment of this disclosure.

FIG. 7 illustrates an example electronic device 700 that includes an antenna panel 702a for radar operations and a separate antenna panel 702b for 5G communication operations in accordance with an embodiment of this disclosure.

The architecture of the electronic device 700 includes a radar system (also simply referred to as "radar") that comprises a radar module 704 and the antenna panel 702a. The architecture of the electronic device 700 further includes a wireless communication system that comprises a wireless communication module 706 (for example, a 5G communication module) and the antenna panel 702b. Internally, within the electronic device 700, a control interface 708 connects the radar module 704 to the wireless communication module 706 to enable the two systems to communicate control signals to each other. The antenna panels 702a-702b can be similar to the antenna modules 302 of FIG. 3, or the transmit and receive antennas 414 and 416 of the monostatic radar of FIG. 4. Each of the antenna panels 702a-702b includes multiple antenna elements.

The architecture of the electronic device 700 may suffer from an inter-system interference problem due to a lack of RF isolation between the two systems. As an example, inter-system interference 710 may occur between the internal circuits associated with the radar module 704 and the internal circuits associated with the wireless communication module 706. As another example, RF interference over-the-air 720 may occur inter-system, between the wireless communication system and the radar system.

Independent communication operations and radar operations by an electronic device 700 may not be possible when the radio frequency (RF) isolation between the wireless communication and radar systems is not sufficient. The radar transmission interference to the 5G signal reception can depend on the radar Tx power, the radar bandwidth, the radar Tx power spectral density, and the 5G system bandwidth which is interfered by the radar transmission. For directional radar and/or directional 5G beams, the radar interference level to the 5G DL reception can also be a function of the operating beams. Under this condition of directional beams, simultaneous communication reception and radar transmission (or simultaneous communication transmission and radar reception) may not be feasible due to the interference between the two systems.

In the embodiment shown in FIG. 7, the electronic device 700 includes multiple processors (such as the processor(s) 240 of FIG. 2) comprising the radar module 704 and wireless communication module 706, respectively. This disclosure is not limited to the radar module 704 and the wireless communication module 706 being two discrete hardware components. In other embodiments, the radar module 704 and wireless communication module 706 may be software modules that are stored in memory (such as the memory 260 of FIG. 2) and executed by one or more processors in the electronic device 700. However, for simplicity, the radar module 704 will be described as the radar, which detects the range, velocity and/or angle of a target object (such as the target object 408 of FIG. 4) and which is used for proximity sensing, gesture recognition, liveness detection, mmWave blockage detection, and so on.

The wireless communication module 706 enables the electronic device 700 to perform wireless communication with the network (such as the network 102 of FIG. 1). For example, the wireless communication module 706 enables the electronic device 700 to establish a connection with a base station (for example, base station 116).

A base station 116 could utilize one or multiple transmit beams to cover the whole area of one cell. The base station 116 may form a transmit beam by applying suitable gains and phase settings to an antenna array of the base station. In order to overcome higher propagation losses at higher frequencies such as the mmWave frequency, the base station 116 may form multiple transmit beams, each transmit beam providing coverage over a region narrower than the whole coverage region of the one cell. The wireless communication module 706 may also form receive beams to increase the signal-to-interference-and-noise ratio (SINR) at the receiver within the electronic device 700. Analogously, in the uplink scenario, the wireless communication module 706 may form transmit beams, and the base station 116 may form receive beams.

The electronic device 700, using wireless communication module 706, and the base station 116 implement a beam sweeping procedure to assist the electronic device 700 in determining or selecting the electronic device's receive beam and/or transmit beam. The beam sweeping procedure includes the base station 116 transmitting a set of transmit beams to sweep the cell area, and the electronic device 700 measuring the signal quality on different beams using electronic device's downlink receive beams. To facilitate candidate beam identification, beam measurement, and beam quality reporting, the base station 116 configures the electronic device 700 with one or more reference signal (RS) resource corresponding to a set of downlink TX beams. Examples of an RS resource include an SSB, channel state information RS (CSI-RS) resource, and/or CSI-RS resource indicator (CRI). The CSI-RS resources can be periodic, aperiodic, or semi-persistent. An RS resource refers to a reference signal transmission on a combination of one or more time/frequency/spatial domain locations. As an example, the time domain, frequency domain, and spatial domain can be represented as an Orthogonal Frequency Division Modulation (OFDM) symbol, resource element, and antenna port, respectively. For each DL receive beam, the electronic device 700 reports different DL transmit beams received using that DL receive beam, ranked in order of signal strength (RSRP) and optionally CSI. Examples of CSI include Channel Quality Indicator (CQI), Precoding Matrix Indicator (PMI), or rank indicator (RI). Based on the measurement report feedback received from the electronic device 700, the base station 116 indicates to the electronic device 700 with one or more Transmission Configuration Indicator (TCI) states for reception of Physical Downlink Control Channel (PDCCH) and/or Physical Downlink Shared Channel (PDSCH).

To compensate for the narrower analog beamwidth in mmWave, electronic device 700 can employ analog beam sweeping to enable wider signal reception or transmission coverage for the electronic device 700. A beam codebook includes a set of codewords, where a codeword is a set of analog phase shift values, or a set of amplitude plus phase shift values, applied to the antenna elements, in order to form an analog beam.

The electronic device 700, using the wireless communication module 706, implements a beam management procedure to maintain the selected antenna module as well as the corresponding selected beam of the antenna module for signal reception and transmission by the electronic device 700. The electronic device 700 can use multiple antenna panels 702a-702b simultaneously, in which case the beam management procedure can select a beam of each antenna panel 702a and 702b for signal reception and transmission by the electronic device 700.

FIG. 8 illustrates an example electronic device 800 that includes a common antenna panel 802 for radar operations and 5G communication operations in accordance with an embodiment of this disclosure. The electronic device 800 further includes a radar module 704, wireless communication module 706, and control interface 708, which may be the same as or similar to corresponding components in FIG. 7. The electronic device 800 includes a switch 810 that connects the antenna panel 802 to the wireless communication module 706 for wireless communication operations, and that switches to alternatively connect the antenna panel 802 to the radar module 704 for radar operations. The antenna panel 802 can be similar to the antenna module 302 of FIG. 3 and includes multiple antenna elements. As described above, due to a lack of RF isolation between the two systems, inter-system interference may occur in the switch 810 due to imperfect isolation.

Although FIG. 7 and FIG. 8 illustrate two examples of an electronic device that includes a radar module and a wireless communication module, various changes may be made to FIG. 7 and FIG. 8. As a particular example, the wireless communication module 706 and the radar module 704 can be manufactured by the same manufacturer or by different manufacturers the control interface 708 provides.

Figure 9:
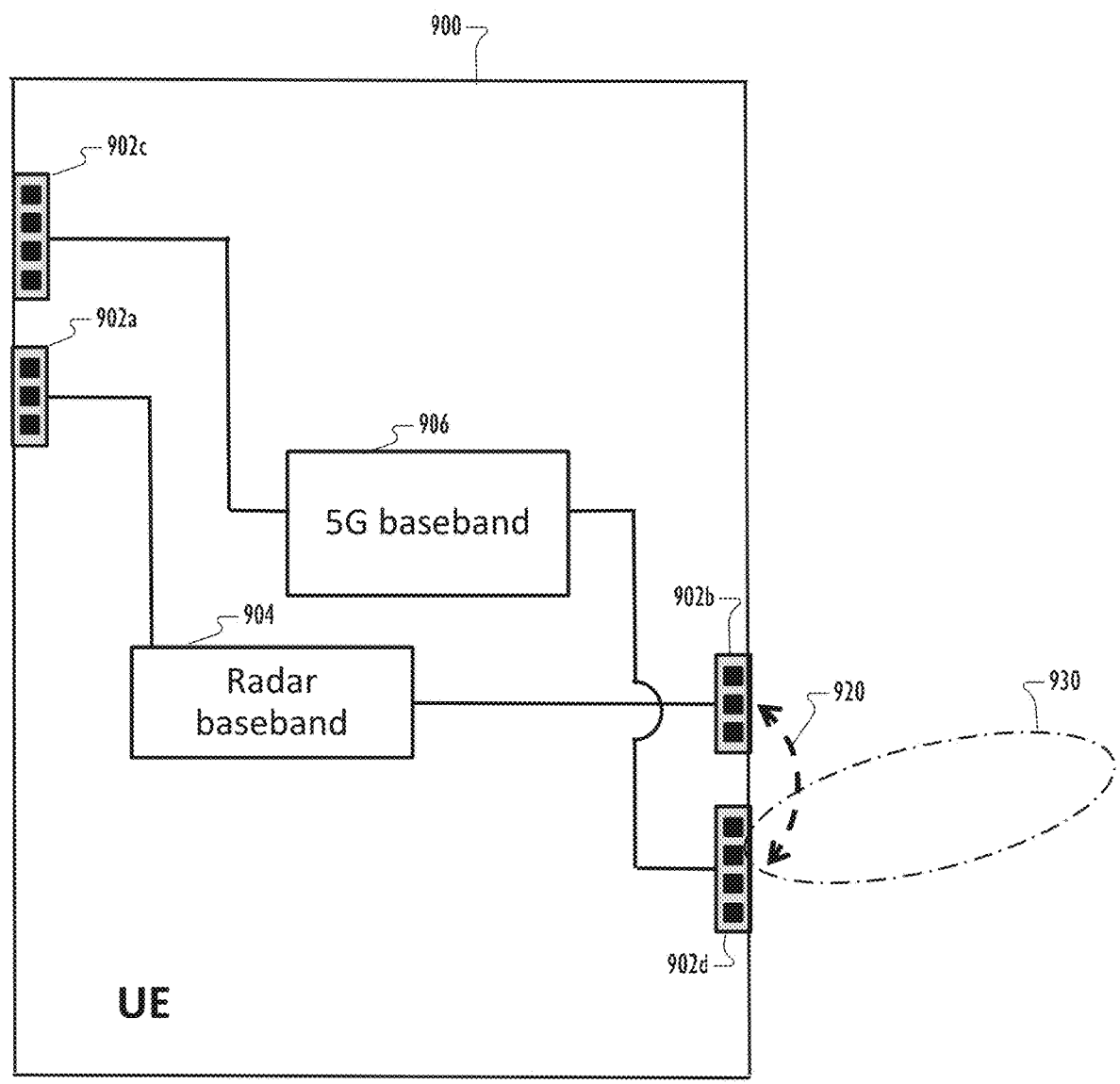
FIG. 9 illustrates an electronic device that includes an example radar performing over-the-air channel sensing of wireless communication transmission in accordance with an embodiment of this disclosure.

FIG. 9 illustrates an electronic device 900 that includes an example radar performing over-the-air channel sensing of wireless communication transmission in accordance with an embodiment of this disclosure. The embodiment of the electronic device 900 illustrated in FIG. 9 is for illustration only and other embodiments can be used without departing from the scope of the present disclosure.

The components within the electronic device 900 can perform the same or similar function as the components within the above-described electronic device 200, 300, 400, 700, 800. The architecture of the electronic device 900 includes a radar and a wireless communication system and can be the same as or similar to the architecture of the electronic device 700 of FIG. 7. Particularly, the one or more antenna panels 902a-902b (also referred to as first and second radar antenna panels) and radar module 904 within the radar of the electronic device 900, and the one or more antenna panels 902c-902d (also referred to as first and second 5G antenna panels) and wireless communication module 906 within the wireless communication system of the electronic device 900 can be the same as or similar to the corresponding components 702a, 704, 702b, 706 of the electronic device 700 of FIG. 7. The antenna panels 902a-902d can be similar to the antenna modules 302 of FIG. 3, or the transmit and receive antennas 414 and 416 of the monostatic radar of FIG. 4. Each of the antenna panels 902a-902d includes multiple antenna elements.

The architecture of the electronic device 900 may suffer from an inter-system interference problem due to a lack of RF isolation between the radar and wireless communication systems, such as inter-system interference or RF interference over-the-air 920. In the example shown, the second 5G antenna panel 902d is transmitting (shown by RF energy 930), and the first 5G antenna panel 902c is not transmitting. The transmission from the second 5G antenna panel 902d generates RF interference over-the-air 920, which is sensed by the second radar antenna panel 902b but is not sensed by the first radar antenna panel 902a due to the larger path loss and isolation. In order to avoid inter-system interference, the radar of the electronic device 900 can sense the RF 930 in a channel over which the wireless communication module 906 transmits and receives, and then perform radar operations in response to a determination that the sensing of the RF 930 indicates the channel is not busy. That is, while the RF energy 930 indicates the second 5G antenna panel 902d is transmitting, the second radar antenna panel 902b is not permitted to transmit and receive radar signals, but the radar antenna panel 902a is permitted to be used to transmit and receive radar signals.

According to embodiments of this disclosure, the radar module 904 determines time slots for radar operation using over-the-air channel sensing of activity of the wireless communication module, for example, sensing 5G NR UL transmission activity. If the sensed channel is determined as being busy, then the radar module 904 determines that radar operation is not permitted for a predetermined time duration. If the sensed channel is determined as being not busy, then the radar module 904 determines that radar operation is permitted for a predetermined time duration. To prevent the radar operation from causing interference (for example, RF interference over-the-air 920) to the wireless communication DL reception of the electronic device 900, this channel sensing procedure followed by the decision to perform radar operation can be performed during 5G UL symbols.

For example, a 5G NR UL transmission event is based on a combination of 5G RRC configuration and scheduling decision by the gNB 116 and can be dynamic in nature. An example of being dynamic in nature is a scenario in which the electronic device 900 transmits in a time slot of a UL symbol depending on whether reception of a DL control channel is prior to the time slot of the UL symbol instructing the electronic device 900 to do the transmitting in the time slot of the UL symbol. To ensure co-existence between 5G UL and radar operation, this disclosure provides a technical solution in which the radar module 904 keeps track of the dynamic UL transmission event to determine (e.g., generate) the radar's own transmission and reception schedule.

Typically, the gNB 116 updates the RRC configuration significantly less frequently than a fully dynamic fashion, and accordingly, the RRC configuration is herein referred to as "semi-static." In certain embodiments, the time slots of 5G UL symbols are determined by the RRC configuration in order for the determination of the time slots of the 5G UL symbols to have an inheritably semi-static nature. The radar module 904 can utilize the timing information derived from the time slots of RRC-configured UL symbols to determine a set of possible time slots to perform radar operations. Also, the radar module 904 can utilize the timing information derived from the time slots of RRC-configured UL symbols to make a dynamic decision on whether to operate the radar on one or more of the possible time slots via channel sensing. The dynamic decision making that radar module 904 performs is a technical solution that reduces internal coordination signaling overhead between the wireless communication module 906 and the radar module 904 within the electronic device 900.

The embodiments in this disclosure can also be used to mitigate or avoid interference of UL transmissions from another, external electronic device (e.g., UE) that is sufficiently nearby, such as within a specified range of distances relative to the electronic device 900. The other, external electronic device connected to the same 5G network is also RRC-configured with the same set of UL symbols (including corresponding time slots) and all the UEs (including electronic device 900 and the other, external electronic device) are time synchronized to the 5G network.

Although FIG. 9 illustrates an example of an electronic device that includes an example radar performing over-the-air channel sensing of wireless communication transmission, various changes may be made to FIG. 9. As a particular example, 5G is used as the example for the wireless communication module 906 with which the radar 904 coordinates or co-exists, but the embodiments in this disclosure can also be applied to other wireless communication technologies such as IEEE 802.11ad/ay and future wireless standards (e.g., 5G advanced, 6G). As another example, each of the antenna panels 902a-902b include three antenna elements, and each of the antenna panels 902c-902d include four antenna elements in the embodiment shown in FIG. 9, but in other embodiments, the antenna panels 902a-902b of the radar can include an equal number of antenna elements as antenna panels 902c-902d of the wireless communication system. As another particular example, the wireless communication module 906 and the radar module 904 can be positioned on a common printed circuit board (PCB) or on different PCBs. As another example, the wireless communication module 906 and the radar module 904 can be manufactured by a common manufacturer by different manufacturers.

FIGS. 10A and 10B respectively illustrate a first example and a second example of a channel sensing outcome and resulting radar operation in accordance with an embodiment of this disclosure. The first example 1000 of a channel sensing outcome, as shown in FIG. 10A, corresponds to and is shown with a time-domain mapping of a uniform slot format determined as a result of executing a channel sensing schedule determination procedure in accordance with an embodiment of this disclosure. FIG. 10B shows a time-domain mapping of a non-uniform slot format, to which the second example 1002 of a channel sensing outcome corresponds. The various slot formats and the various embodiments of the channel sensing outcomes illustrated in FIGS. 10A and 10B are for illustration only and other embodiments can be used without departing from the scope of the present disclosure. For example, various 5G NR slot formats are described in 3GPP TS 38.213 V15.12.0, and the slot format configuration can be in a static, semi-static, or fully dynamic fashion.

The electronic device 900 is connected to a network 102 (such as 5G network) and receives RRC configuration from the network. The RRC configuration generally determines the time-frequency resources of UL transmissions that the electronic device 900 is required to perform. Receiving the RRC configuration can include the electronic device 900 being provided tdd-UL-DL-ConfigurationCommon. The information within the tdd-UL-DL-ConfigurationCommon indicates a slot format and enables the electronic device 900 to set the slot format per slot over a number of slots indicated by the tdd-UL-DL-ConfigurationCommon. A slot format includes downlink symbols 1004, uplink symbols 1006, and flexible symbols 1008. A UL transmission block includes of one or more consecutive UL OFDM symbols 1006, which are enabled to be utilized by the electronic device 900 to transmit a UL physical channel or a UL signal. For simplicity, one or more consecutive UL OFDM symbols 1006 is also referred to as UL transmission block 1006 or UL slot 1006. Similarly, one or more consecutive DL OFDM symbols 1004 is also referred to as DL slot 1004, and one or more consecutive flexible OFDM symbols 1008 is also referred to as flexible slot 1008. The slot format configured by network is typically semi-static in time. For example, the network configuration may not change over a relatively long time, such as over few hours or days.

The electronic device 900 can be provided tdd-UL-DL-ConfigurationCommon by the network 102 via the base station 116. The tdd-UL-DL-ConfigurationCommon information enables the electronic device 900 to set the slot format per slot 1010 over a number of slots. The tdd-UL-DL-ConfigurationCommon information enables the electronic device 900 to set the following: a slot configuration period of P milliseconds by dl-UL-TransmissionPeriodicity; a number of slots $d_{slots}$ with only downlink symbols by nrofDownlinkSlots; a number of downlink symbols $d_{sym}$ by nrofDownlinkSymbols; a number of slots $u_{slots}$ with only uplink symbols by nrofUplinkSlots; and a number of uplink symbols $u_{sym}$ by nrofUplinkSymbols.

As a particular example, the slot format shown in FIG. 10A is slot format 32, which has been configured by RRC to the electronic device 900 for each slot (e.g., slot n, slot n+1, slot n+3, and so forth). Slot format 32 defines that there are two UL symbols 1006 at the end of each slot (symbol index number 12 and 13). Also, slot format 32 defines that there are ten DL symbols at the start of each slot (symbol index number 0 through 9) followed by two flexible symbols 1008 (symbol index number 10 and 11).

Receiving the RRC configuration can additionally include the electronic device 900 being additionally provided tdd-UL-DL-ConfigurationDedicated by the network. The parameter tdd-UL-DL-ConfigurationDedicated overrides flexible symbols 1008 per slot over the number of slots as provided by tdd-UL-DL-ConfigurationCommon. The tdd-UL-DL-ConfigurationDedicated information enables the electronic device 900 to set the following: a set of slot configurations by slotSpecificConfigurationsToAddModList; and a slot index for a slot provided by slotIndex for each slot configuration from the set of slot configurations. Also, for each slot configuration from the set of slot configurations, the tdd-UL-DL-ConfigurationDedicated information includes a set of symbols for a slot by a symbols information element. If the symbols information element is allDownlink, then all symbols in the slot are downlink. If the symbols information element is allUplink, then all symbols in the slot are uplink. If the symbols information element is explicit, then nrofDownlinkSymbols provides a number of downlink first symbols in the slot, and nrofUplinkSymbols provides a number of uplink last symbols in the slot. If nrofDownlinkSymbols is not provided, then there are no downlink first symbols in the slot. If nrofUplinkSymbols is not provided, then there are no uplink last symbols in the slot. The remaining symbols in the slot are flexible symbols.

Focusing on enabling time-domain multiplexing radar and wireless communication operations (e.g., 5G), the RRC configuration informs the electronic device 900 of possible UL transmission blocks (e.g., UL symbols 1006) over time for the electronic device 900, with a periodic interval (for example, slot configuration period 1010) determined by dl-UL-TransmissionPeriodicity. That is, the RRC configuration provides the electronic device 900 with the information regarding the UL transmission blocks over time, such as over the slot configuration periods 1010a-1010d corresponding to slot n, slot n+1, slot n+2, slot n+3, and so forth, respectively. For simplicity, the slots n, slot n+1, slot n+2, and slot n+3 that correspond to the slot configuration periods 1010a-1010d are also referred to as simply "slot" 1010a-1010d, respectively. The slots 1010a-1010d have a uniform slot format (for example, defined by slot format 32), which includes downlink symbols 1004 for a duration $t_0$-$t_1$, uplink symbols 1006 for a duration $t_2$-$t_3$, and flexible symbols 1008 for a duration $t_1$-$t_2$ intermediately between the downlink and uplink symbols 1004 and 1006.

The RRC configuration indicates time-frequency resources for the various UL physical channels and signals that can be used by the electronic device 900 for transmission of uplink channels or uplink signals, for example, Physical Uplink Control Channel (PUCCH), Physical Uplink Shared Channel (PUSCH), Physical Random-Access Channel (PRACH), or Sounding Reference Signal (SRS). That is, a UL transmission block includes one or more consecutive UL OFDM symbols (e.g., UL symbols 1006), which can be utilized by the electronic device 900 to transmit a UL physical channel or a UL signal. The slot format and the RRC-configured time-frequency resources for the UL physical channels or UL signals indicate the possible UL transmission activities over a time period, however whether or not actual UL transmission occurs depends on dynamic signaling to the UE from the network. Examples of such dynamic signaling to the UE includes dynamic UL PUSCH scheduling, and dynamic DL PDSCH scheduling which determines if the corresponding HARQ-ACK would be transmitted in a PUCCH at a later time. According to embodiments of this disclosure, as a technical solution, the actual UL transmission event can be detected by channel sensing, and the RRC-configured time-frequency resources can be utilized by the electronic device 900 to determine proper radar channel sensing and operation timing, so as to avoid inter-system interference (e.g., RF interference over-the-air 920) on the UE.

As labeled in the legend of FIG. 10A, a fraction of time in the beginning of at least some of the UL transmission blocks (e.g., each UL transmission block of UL symbols 1006; or not necessarily every UL transmission block) can be used by the radar module 904 of the electronic device 900 to perform channel sensing, and is referred to as a channel sensing time duration. In certain embodiments, the channel sensing time duration can be 5 µs, but other values are also possible depending on implementation and desired channel sensing sensitivity. According to the slot format 32 of the first example 1000, the radar module 904 performs channel sensing at the start of the OFDM symbol number 12 for each slot 1010a-1010d. For example, a set of starting symbol indices corresponding to a start of the UL transmission blocks 1006a-1006d constitute the channel sensing starting times. However, an UL physical channel/signal having a starting symbol index that is embedded within another UL physical channel/signal time resources can be excluded from the channel sensing when the channel sensing result is busy for the larger UL physical channel/signal time resources, because the busy channel sensing result for the entire UL transmission block 1006 determines the action for the radar 904 based on the UL transmission block 1006 being a larger time resource block than the UL physical channel/signal having the embedded starting symbol index.

In response to the radar module 904 detecting RF energy 930 during the channel sensing time duration of an UL transmission block 1006a, then the radar module 904 determines that an actual UL transmission event occurs during the UL transmission block 1006a, for example, the UL transmission block 1006 contains active 5G UL symbols. At the radar module 904, the determination that an actual UL transmission event occurs during the UL transmission block 1006a is also a determination that the UL transmission block 1006a is not available for radar transmission or reception. Similar to the first slot 1010a (slot n), in the third slot 1010c (slot n+2) also, the channel sensing result indicates that there is an active 5G UL transmission, therefore the UL symbols 1006a and 1006c are not available for radar transmission and radar reception within the first and third slots 1010a and 1010c.

On the other hand, in response to the radar module 904 not detecting RF energy 930 during the channel sensing time duration of an UL transmission block 1006b, then the radar module 904 determines that a possible UL transmission event occurs during the UL transmission block 1006b, for example, the UL transmission block 1006 contains inactive 5G UL symbols. The possible UL transmission event that occurs during the UL transmission block 1006b can include no transmission event, namely, the event in which no transmission occurs during the UL transmission block 1006b. At the radar module 904, the determination that no actual UL transmission event occurs during the UL transmission block 1006b is also a determination that the UL transmission block 1006b is available for radar transmission or reception. As shown in the first example 1000 of the channel sensing outcome and resulting radar operation, radar module 904 performs radar operations during a remainder fraction of the second and fourth (inactive) UL transmission blocks 1006b and 1006d after the channel sensing time duration, and radar module 904 refrains from performing radar operations during a remainder fraction of the first and third (active) UL transmission blocks 1006a and 1006c after the channel sensing time duration. Similar to the second slot 1010b (slot n+1), in the fourth slot 1010d (slot n+3) also, the channel sensing result indicates that there is no active 5G UL transmission, therefore the UL symbols 1006b and 1006d are available for radar transmission and radar reception within the second and fourth slots 1010b and 1010d.

Referring to FIG. 10B, the second example 1002 of a channel sensing outcome corresponds to the time-domain mapping of the non-uniform slot formats. The non-uniform slot formats include a downlink slot 1004 for a duration $t_0$-$t_3$ that is the entirety of a first slot 1010e (slot n), a different slot format during a second slot 1010f (slot n+k), and multiple UL transmission blocks 1006f and 1006g for respective durations $t_0$-$t_2$ and $t_2$-$t_3$ during a third slot 1010g (slot n+k+1). Particularly, the first slot 1010e (slot n) is configured with slot format 0 (all DL symbols). The second slot 1010f (slot n+k) is defined by slot format 32, which is the same slot format as the first slot 1010a of FIG. 10A, and the RRC configuration further defines that the two UL symbols are to be used for PUCCH format 0 transmission. The third slot 1010g (slot n+k+1) is configured with slot format 1 (all UL symbols), and the RRC configuration defines that PUSCH (e.g., with Configured Grant) may be transmitted from symbol number 0 to 11, while PUCCH format 0 with 2 symbols may be transmitted in symbol number 12 and 13.

On the other hand, there is an active 5G UL transmission sensed at symbol 12, therefore the UL symbols 12 and 13 are not available for radar TX/RX. As shown in the second example 1002 of the channel sensing outcome and resulting radar operation, the channel sensing result indicates that there is an active 5G UL transmission during the second slot 1010f, therefore the UL symbols 1006e are not available for transmitting and receiving radar signals. In the third slot 1010g (slot n+k+1), the radar 904 performs channel sensing at the start of symbol 0 of UL transmission block 1006f and again at the start of symbol 12 of UL transmission block 1006g. The channel sensing result indicates that there is no active 5G UL transmission for the PUSCH resource of UL transmission block 1006f, and therefore UL transmission block 1006f (symbols 0 through 11) are available for radar TX/RX. The radar module 904 performs radar operations during a remainder fraction of the second (inactive) UL transmission block 1006f after the channel sensing time duration, and radar module 904 refrains from performing radar operations during a remainder fraction of the first and third (active) UL transmission blocks 1006e and 1006g after the channel sensing time duration.

Although FIGS. 10A and 10B illustrate two examples 1000 and 1002 of a channel sensing outcome and resulting radar operation, various changes may be made to FIGS. 10A and 10B. As a particular example, after the first slot 1010e (slot n) and before the second slot 1010f (slot n+k), the intermediate slot(s) can have slot formats that are uniform with each other or non-uniform.

Figure 11:
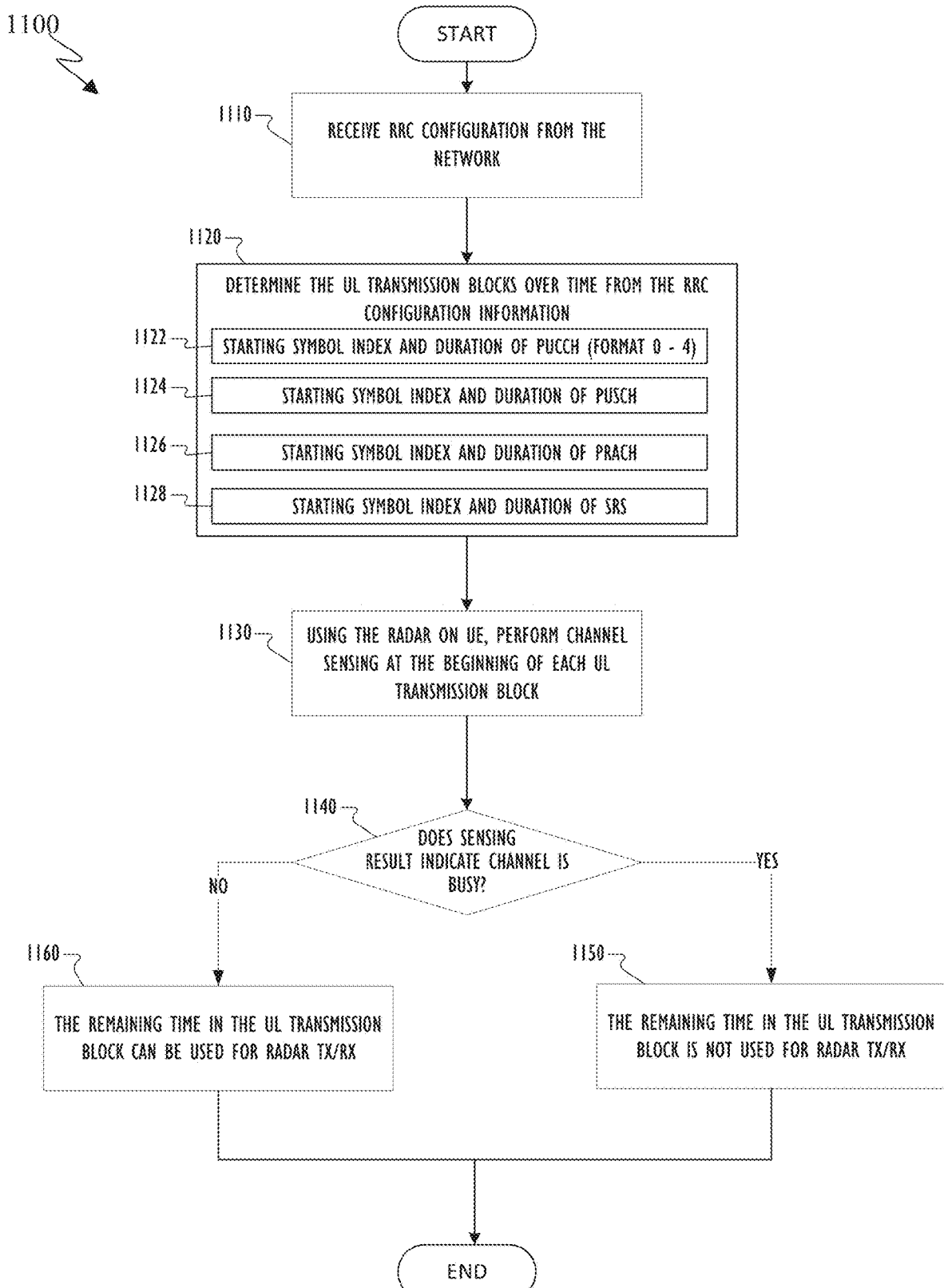
FIG. 11 illustrates a method for over-the-air coordination of radar and wireless communication systems on a terminal in accordance with an embodiment of this disclosure.

FIG. 11 illustrates a method 1100 for over-the-air coordination of radar and wireless communication systems on a terminal in accordance with an embodiment of this disclosure. The method 1100 can be referred to by various names, such as a channel sensing schedule determination procedure, or procedure to determine the channel sensing timing for radar operation. The embodiment of the method 1100 shown in FIG. 11 is for illustration only, and other embodiments could be used without departing from the scope of this disclosure. The method 1100 can be implemented by an electronic device 200, 300, 400, 700, 800, 900 that includes the radar module 904 and the wireless communication module 906. More particularly, the method 1100 could be and is described as being performed by a processor 240 of the electronic device 200.

At the start of the method 1100, the electronic device 200 is connected to a 5G network. At block 1110, the processor 240 obtains configuration information for a radio interface between the electronic device 200 and a base station 116. In certain embodiments, obtaining the configuration information includes receiving RRC configuration from the network (such as the network 102) for a wireless communication channel (such as the radio interface) between the electronic device 200 and the base station 116.

At block 1120, the processor 240 determines uplink transmission information based on the obtained configuration information. In certain embodiments, the uplink transmission information includes UL transmission blocks over time from the obtained RRC configuration information. The uplink transmission information includes: an indication of one or more types of uplink channels in a plurality of communication time slots of the radio interface; a transmission start time for each of the one or more types of uplink channels; and a transmission duration for each of the one or more types of uplink channels. In certain embodiments, the uplink transmission information includes a starting symbol index and duration of PUCCH (format 0, 1, 2, 3, 4), as shown at block 1122. In certain embodiments, the uplink transmission information includes a starting symbol index and duration of PUSCH, as shown at block 1124. In certain embodiments, the uplink transmission information includes a starting symbol index and duration of PRACH, as shown at block 1126. In certain embodiments, the uplink transmission information includes a starting symbol index and duration of SRS, as shown at block 1128.

In certain embodiments, the processor 240 determining of the uplink transmission information based on the obtained configuration information is a subprocess (namely, block 1120) of the method 1100 that includes: determining whether the time resource block of an UL transmission block 1006 is sufficiently long, such as greater than or equal to a threshold duration. The threshold duration can be a duration of one or two OFDM symbols. In response to determining that the UL transmission block 1006 is not sufficiently long for channel sensing and radar operation, the insufficiently-long UL transmission block 1006 can be excluded from the channel sensing schedule. For example, an SRS that occupies only one OFDM symbol, or certain configuration of PUCCH format with one OFDM symbol, as shown in Table 1, can be determined as not available for radar operation.

TABLE 1

PUCCH formats and the length in OFDM symbols

| PUCCH format | Length in OFDM symbols |
|---|---|
| 0 | 1-2 |
| 1 | 4-14 |
| 2 | 1-2 |
| 3 | 4-14 |
| 4 | 4-14 |

The method 1100 iteratively repeats blocks 1130-1160 for each respective communication time slot from among of the one or more of the plurality of communication time slots (which were determined at block 130). Blocks 1130-1140 provide a channel sensing procedure that the processor 240 executes during the respective communication time slot (for example, during a 5G UL symbol). In certain embodiments described more particularly below, the channel sensing procedure includes determining whether an uplink transmission is occurring on radio interface between the electronic device 200 and a base station 116, wherein the determining commences at the UL transmission start time of the respective communication time slot that is obtained from the configuration information (such as the RRC configuration information). Blocks 1150-1160 provide a response to the channel sensing procedure. In certain embodiments described more particularly below, the response to the channel sensing procedure includes in response to a determination that the UL transmission is not occurring on the radio interface, the processor 240 causes a radar module 904 of the electronic device 200 to transmit and/or receive radar signals for a remaining duration of the respective communication time slot (namely, the UL time block).

At block 1130, the processor 240, using the radar of the electronic device 200, performs channel sensing at the beginning of the respective communication time block (such as UL transmission block 1006). To perform channel sensing, the processor 240 controls the radar of the electronic device 200 to detect or sense for RF energy 930 in the radio interface.

According to this disclosure, the channel sensing function is not required to be implemented as part of the radar module 904. In certain embodiments, the electronic device 900 includes a channel sensing module, which is discrete (e.g., separate) from the radar module 904, includes a connection to the radar antenna panel 902a-902b and performs the channel sensing function. However, to minimize the latency between the channel sensing and the radar operation, it can be advantageous to implement channel sensing function within the radar module 904.

At block 1140, the processor 240, using the radar module 904, determines whether the respective communication time slot on the radio interface is occupied with RF energy 930. If the sensing result indicates that the wireless communication channel is occupied (e.g., busy or active), then the method 1100 proceeds to block 1150, but if the sensing result indicates that the wireless communication channel is not occupied (e.g., not busy or inactive), then the method 1100 proceeds to block 1160. Whether or not the channel is busy can be determined by sensing energy (e.g., RF energy) and comparing the sensed energy to a radar detection sensitivity threshold, which threshold can be determined from the radar detection sensitivity.

At block 1150, in response to a determination that the respective communication time slot on the radio interface is occupied, the processor 240 does not perform radar operations during a duration of the respective communication time slot. More particularly, the remaining time in the UL transmission block is not used for radar transmission or radar reception.

At block 1160, in response to a determination that the respective communication time slot on the radio interface is not occupied, the processor 240 performs radar operations during a remainder of a duration of the respective communication time slot. More particularly, the remaining time in the UL transmission block is available to be used for radar transmission and radar reception.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 12:
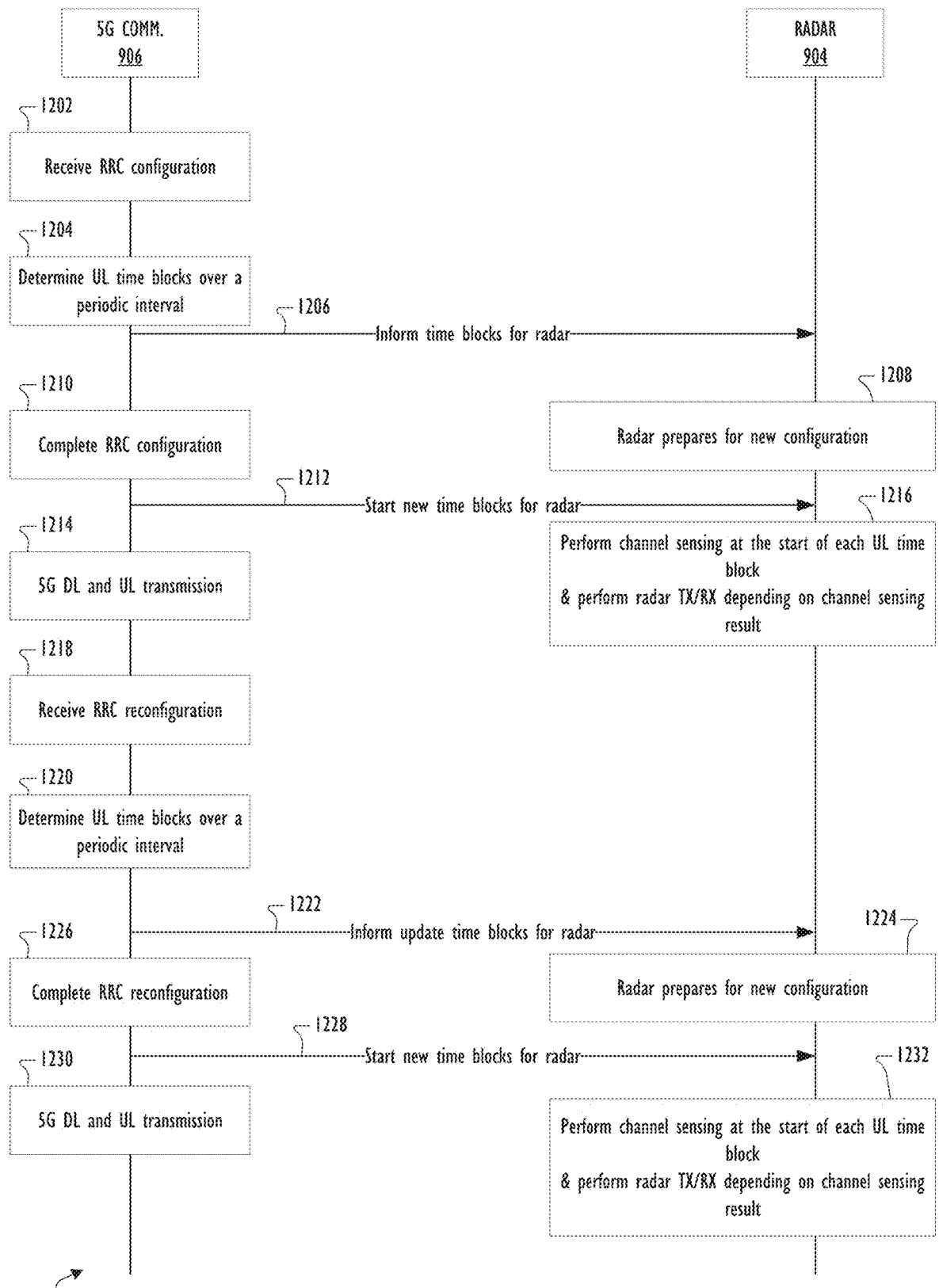
FIG. 12 illustrates a process for coordination between a wireless communication module and a radar module that implement the method for over-the-air coordination of radar and wireless communication systems on a terminal in accordance with an embodiment of this disclosure.

FIG. 12 illustrates a process 1200 for coordination between a wireless communication module and a radar module that implement the method for over-the-air coordination of radar and wireless communication systems on a terminal in accordance with an embodiment of this disclosure. The embodiment of the coordination process 1200 shown in FIG. 12 is for illustration only, and other embodiments could be used without departing from the scope of this disclosure. The coordination process 1200 will be described as being performed by the wireless communication module 906 and the radar module 904 of FIG. 9, which communicate with each other via a control interface (for example, control interface 708 of FIG. 7).

The coordination signaling can be performed in two steps. In the first step, the 5G module sends a new time blocks configuration to the radar module, however the configuration does not immediately take effect. This allows the radar module to complete the operation based on the previous configuration, and the time to prepare for the new configuration. In the second step, upon completion of the RRC configuration, the 5G module sends a signal to indicate that the new configuration has taken effect. The radar module can then start the channel sensing and radar operation based on the new configuration.

At block 1202, which is similar to block 1110, the wireless communication module 906 receives RRC configuration information from the network 102. At block 1204, which is similar to block 1120, the wireless communication module 906 determines UL time blocks over a periodic interval (e.g., slot configuration period 1010) by decoding the RRC configuration information and sends a preparation coordination signal 1206 to the radar 904. The preparation coordination signal 1206 informs the radar 904 of the UL time blocks to be used by radar 904 to perform channel sensing and radar operation. Also, the preparation coordination signal 1206 informs the radar 904 that RRC configuration is not yet effective at the wireless communication module 906.

In response to receiving the preparation coordination signal 1206, channel sensing is not yet activated by the radar 904, based on the indication that RRC configuration is not yet effective. At block 1208, the radar 904 prepares for the newly received, not yet effective, RRC configuration.

At block 1210, the wireless communication module 906 completes RRC configuration and sends a completion coordination signal 1212 to the radar 904. The completion coordination signal 1212 informs the radar 904 of a start time of the new UL time blocks to be used by radar 904 to perform channel sensing and radar operation, which indicates that the RRC configuration is effective at the wireless communication module 906. At block 1214, according to the completed RRC configuration, the wireless communication module 906 performs DL and UL communication, for example, performing 5G DL and UL transmission.

In response to receiving the completion coordination signal 1212, the radar 904 activates (or enables) channel sensing based on the indication that RRC configuration is effective. At block 1216, which is similar to blocks 1130-1160, the radar 904 performs channel sensing at the start of a first UL transmission block 1006a from among a plurality of UL transmission blocks 1006a-1006d, and selectively performs radar operations (i.e., radar transmission and radar reception) depending on the channel sensing result. The radar 904 repeats the procedure of block 1216 for one or more of the plurality of UL transmission blocks 1006a-1006d. In certain embodiments, the procedure of block 1216 is repeated for some of the types of uplink channels 1006f from among a plurality of types of uplink channels 1006f-1006g in some communication time slot(s) 1010g from among a plurality of communication time slots 1010e-1010g. In certain embodiments, the procedure of block 1216 is repeated for each of the types of uplink channels 1006f and 1006g in some communication time slot(s) 1010g from among a plurality of communication time slots 1010e-1010g. In certain embodiments, the procedure of block 1216 is repeated for each communication time slot 1010 from among a plurality of communication time slots 1010a-1010d and for each of the types of uplink channel 1006a-1006d in the communication time slot.

When the RRC configuration is semi-static, the wireless communication module 906 has been operating at block 1214 for hours or days until the network 102 changes the RRC configuration by generating and sending (via the base station 116) a new RRC configuration to the electronic device 200 for updating or RRC reconfiguration. At block 1218, which is similar to block 1202, the wireless communication module 906 receives RRC reconfiguration information. In response to receiving the RRC reconfiguration information, the wireless communication module 906 and radar 904 perform the procedures of blocks 1218, 1220 (including sending preparation coordination signal 1222), 1224, 1226 (including sending completion coordination signal 1228), 1230, and 1232, which are similar to blocks 1202, 1204 (including sending preparation coordination signal 1206), 1208, 1210 (including sending completion coordination signal 1212), 1214, and 1216, respectively.

Although FIG. 12 illustrates an example of a coordination process 1200 between a wireless communication module 906 and a radar module 904, various changes may be made to FIG. 12. For example, the channel sensing operation of block 1216 or block 1232 can be replaced by the wireless communication module 906 informing the radar module 904 about the UL transmission events (e.g., actual UL transmission event in which the radio interface is occupied) via a signaling path on an internal circuit board of the electronic device 200 by using pins, for example, general purpose input/output (GPIO) pins. To determine whether the one or more communication time slots on the radio interface is occupied, the radar 904 can simply check the status of one or more GPIO pins at the beginning of the UL time slot. This checking of signaling via GPIO pins can operate in a similar manner as when performing the channel sensing. As another example, this disclosure is not limited to performing channel sensing on communication time slots that are UL transmission blocks 1006. In certain embodiment, the processor 240 of the electronic device can also perform channel sensing on communication time slots that are DL slots 1004 (e.g., DL reception blocks) in order to determine whether the DL slot is active or inactive to avoid RF interference.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining configuration information for a radio interface between an electronic device and a base station, wherein obtaining the configuration information for the radio interface further comprises:
receiving, via a wireless communication circuit of the electronic device, a first signal indicating a schedule of communication time slots which are not yet effective; and
in response to receiving the first signal, preparing to commence, at a transmission start time of each communication time slot in the schedule, determination of whether the radio interface is occupied;
determining uplink transmission information based on the obtained configuration information, the uplink transmission information comprising:
an indication of one or more types of uplink channels in a plurality of communication time slots of the radio interface;
the transmission start time for each of the one or more types of uplink channels; and
a transmission duration for each of the one or more types of uplink channels; and
for one or more of the plurality of communication time slots:
determining, based on the transmission start time, whether the one or more communication time slots on the radio interface is occupied; and
in response to a determination that the one or more communication time slots on the radio interface is not occupied, performing radar operations during a remainder of the transmission duration.

2. The method of claim 1, wherein the configuration information for the radio interface comprises RRC configuration information for a wireless communication channel between the electronic device and the base station.

3. The method of claim 1, wherein obtaining the configuration information comprises:
receiving, from the wireless communication circuit, a second signal indicating the schedule is effective.

4. The method of claim 1, wherein the one or more types of uplink channels or signals comprises at least one of Physical Uplink Control Channel (PUCCH), Physical Uplink Shared Channel (PUSCH), Physical Random Access Channel (PRACH), and Sounding Reference Signal (SRS).

5. The method of claim 1, wherein the determining of whether the one or more communication time slots on the radio interface is occupied comprises:
sensing radio-frequency (RF) energy at the electronic device; and
comparing the sensed RF energy to a radar detection sensitivity threshold.

6. The method of claim 1, wherein determining whether the one or more communication time slots on the radio interface is occupied comprises checking a status of one or more general-purpose input/output pins of a wireless communication circuit of the electronic device.

7. The method of claim 1, wherein, from among each of the communication time slots, a first communication time slot includes:
a first type of uplink channel that corresponds to a first transmission duration;
and a second type of uplink channel different from the first type of uplink channel and that corresponds to a second transmission duration longer than the first transmission duration.

8. An electronic device comprising:
a radar circuit configured for the electronic device to operate using radar operations;
a wireless communication circuit configured for the electronic device to operate using a wireless communication protocol different from the radar operations; and
a processor configured to:
obtain configuration information for a radio interface between the electronic device and a base station including to:
receive, via the wireless communication circuit of the electronic device, a first signal indicating a schedule of communication time slots which are not yet effective; and
in response to receiving the first signal, prepare to commence, at a transmission start time of each communication time slot in the schedule, determination of whether the radio interface is occupied;
determine uplink transmission information based on the obtained configuration information, the uplink transmission information comprising:
an indication of one or more types of uplink channels in a plurality of communication time slots of the radio interface;
the transmission start time for each of the one or more types of uplink channels; and
a transmission duration for each of the one or more types of uplink channels; and
for one or more of the plurality of communication time slots:
determine, based on the transmission start time, whether the one or more communication time slots on the radio interface is occupied; and
in response to a determination that the one or more communication time slots on the radio interface is not occupied, perform radar operations during a remainder of the transmission duration.

9. The electronic device of claim 8, wherein the configuration information for the radio interface comprises RRC configuration information for a wireless communication channel between the electronic device and the base station.

10. The electronic device of claim 8, wherein the processor is further configured to obtain the configuration information by:
receiving, from the wireless communication circuit, a second signal indicating the schedule is effective.

11. The electronic device of claim 8, wherein the one or more types of uplink channels or signals comprises at least one of Physical Uplink Control Channel (PUCCH), Physical Uplink Shared Channel (PUSCH), Physical Random Access Channel (PRACH), and Sounding Reference Signal (SRS).

12. The electronic device of claim 8, wherein the processor is further configured to determine whether the one or more communication time slots on the radio interface is occupied by:
sensing radio-frequency (RF) energy at the electronic device; and comparing the sensed RF energy to a radar detection sensitivity threshold.

13. The electronic device of claim 8, wherein the processor is further configured to determine whether the one or more communication time slots on the radio interface is occupied by checking a status of one or more general-purpose input/output pins of a wireless communication circuit of the electronic device.

14. The electronic device of claim 8, wherein, from among each of the communication time slots, a first communication time slot includes:
 a first type of uplink channel that corresponds to a first transmission duration;
 and a second type of uplink channel different from the first type of uplink channel and that corresponds to a second transmission duration longer than the first transmission duration.

15. A non-transitory computer readable medium embodying a computer program, the computer program comprising computer readable program code that when executed causes at least one processor to:
 obtain configuration information for a radio interface between an electronic device and a base station by causing the at least one processor to:
  receive, via a wireless communication circuit of the electronic device, a first signal indicating a schedule of communication time slots which are not yet effective; and
  in response to receiving the first signal, prepare to commence, at a transmission start time of each communication time slot in the schedule, determination of whether the radio interface is occupied;
 determine uplink transmission information based on the obtained configuration information, the uplink transmission information comprising:
  an indication of one or more types of uplink channels in a plurality of communication time slots of the radio interface;
  the transmission start time for each of the one or more types of uplink channels; and
  a transmission duration for each of the one or more types of uplink channels; and
 for one or more of the plurality of communication time slots:
  determine, based on the transmission start time, whether the one or more communication time slots on the radio interface is occupied; and
  in response to a determination that the one or more communication time slots on the radio interface is not occupied, perform radar operations during a remainder of the transmission duration.

16. The non-transitory computer readable medium of claim 15, wherein the configuration information for the radio interface comprises RRC configuration information for a wireless communication channel between the electronic device and the base station; and
 wherein the one or more types of uplink channels or signals comprises at least one of Physical Uplink Control Channel (PUCCH), Physical Uplink Shared Channel (PUSCH), Physical Random Access Channel (PRACH), and Sounding Reference Signal (SRS).

17. The non-transitory computer readable medium of claim 15,
 wherein the computer readable program code that when executed cause the at least one processor to obtain the configuration information further comprise computer readable program code that when executed cause the at least one processor to:
  receive, from the wireless communication circuit, a second signal indicating the schedule is effective.

18. The non-transitory computer readable medium of claim 15, wherein the computer readable program code that when executed cause the at least one processor to determine whether the one or more communication time slots on the radio interface is occupied further comprise the computer readable program code that when executed cause the at least one processor to:
 sense radio-frequency (RF) energy at the electronic device; and
 compare the sensed RF energy to a radar detection sensitivity threshold.

19. The non-transitory computer readable medium of claim 15, wherein the computer readable program code that when executed cause the at least one processor to determine whether the one or more communication time slots on the radio interface is occupied further comprises the computer readable program code that when executed cause the at least one processor to check a status of one or more general-purpose input/output pins of a wireless communication circuit of the electronic device.

20. The non-transitory computer readable medium of claim 15, wherein, from among each of the communication time slots, a first communication time slot includes:
 a first type of uplink channel that corresponds to a first transmission duration;
 and a second type of uplink channel different from the first type of uplink channel and that corresponds to a second transmission duration longer than the first transmission duration.

* * * * *